US 7,206,986 B2

(12) United States Patent
Stemerdink et al.

(10) Patent No.: US 7,206,986 B2
(45) Date of Patent: Apr. 17, 2007

(54) METHOD FOR REPLACING CORRUPTED AUDIO DATA

(75) Inventors: Jan Stemerdink, Enschede (NL); Arjan Meijerink, Almelo (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 370 days.

(21) Appl. No.: 10/497,187

(22) PCT Filed: Nov. 30, 2001

(86) PCT No.: PCT/NL01/00873

§ 371 (c)(1),
(2), (4) Date: May 28, 2004

(87) PCT Pub. No.: WO03/047115

PCT Pub. Date: Jun. 5, 2003

(65) Prior Publication Data

US 2005/0043959 A1   Feb. 24, 2005

(51) Int. Cl.
*G10L 21/02* (2006.01)
*H04L 1/00* (2006.01)

(52) U.S. Cl. .................. 714/747; 704/228; 704/233
(58) Field of Classification Search ............... 704/228, 704/233; 714/747
See application file for complete search history.

(56) References Cited

U.S. PATENT DOCUMENTS 5,732,356 A * 3/1998 Bolt ........................ 704/228
5,907,822 A   5/1999 Prieto, Jr.
6,009,389 A * 12/1999 Dokic et al. ................ 704/228
6,026,506 A *  2/2000 Anderson et al. .......... 714/746
6,421,802 B1 * 7/2002 Schildbach et al. ........ 714/747
6,665,637 B2 * 12/2003 Bruhn ........................ 704/206
7,069,208 B2 *  6/2006 Wang ........................ 704/228

FOREIGN PATENT DOCUMENTS

EP       0603854     6/1994
EP       0773630     5/1997

OTHER PUBLICATIONS

Waveform Substitution Techniques for Recovering Missing Speech Segments in Packet Voice Communications, David Goodman, IEEE Transactions on Acoustics, Speech and Signal Processing, ASSP-34: 1449-1464, Dec. 1986.
A Survey of Packet-Loss Recovery Techniques for Streaming Audio, Colin Perkins et al., Aug. 10, 1998, IEEE Network Magazine.
Bluetooth, Connect Without Cables, Prentice Hall PTR 20001, Jennifer Bray et al., pp. 98-99.

* cited by examiner

*Primary Examiner*—R. Stephen Dildine
(74) *Attorney, Agent, or Firm*—Nixon & Vanderhye P.C.

(57) ABSTRACT

A decoding method for coded data representing original data. Corrupted data is detected and replaced with buffered data. The buffered data is stored in the buffer a time interval corresponding to an estimated periodicity or an integer multiple thereof before the corrupted data was received. The estimated periodicity is determined by estimating the periodicity of the original data represented by the corrupted data.

26 Claims, 7 Drawing Sheets

METHOD FOR REPLACING CORRUPTED AUDIO DATA

This application is the US national phase of international application PCT/NLO01/00873 filed in English on 22 Nov. 2001, which designated the US. The entire contents of this application is incorporated herein by reference.

The invention relates to a decoding method for decoding audio data including: receiving coded data representing at least audio data coded with a coding method, said audio data representing audio signals; detecting corrupted data of said coded data; replacing at least a part of said corrupted data with replacement data; decoding said coded data with a decoding method substantially reverse to said coding method whereby said audio data is obtained; and transmitting said obtained audio data further. The invention further relates to a decoder system, devices including such a system and a computer program for performing steps of the method.

In data connections the transmission of data is likely to be impaired by interference. In Bluetooth voice links for example, interference is likely from microwave ovens, other Bluetooth links or wireless transmission systems that operate in the frequency band of 2400–2500 MHz. Interference often occurs in the shape of short error-bursts, i.e. short periods where the received data contain virtually no transmitted information and are more or less random. If the data represents audio-signals and the corrupted data are fed directly into an audio decoder, an annoying crackling noise results. If the loss of information is detected, the missing or corrupted voice data may be replaced by other data that are fed into the audio decoder, in order to avoid this crackling noise. Several of such methods are known in the art.

It is known, for example from J. Bray, C. F. Sturman, "*Bluetooth, Connect Without Cables*", Prentice Hall PTR 20001, pages 98–99 to replace corrupted or lost frames of coded data representing voice signals with silence code (known in the art as muting) or with previously received frames of coded data (known in the art as code repetition).

In the case of muting, a silence code is fed into the audio decoder when loss of data has been detected. In the case of continuous variable slope delta modulation (CVSD) coding, this silence code consists of alternating bits ('101010 . . . '). The silence code makes the decoder produce silence, i.e. zero sound signal samples. The decoder output signal gradually decays to zero. Thereby annoying cracks caused by discontinuities between the silence code and the received coded data are avoided.

In the case of code repetition, the corrupted data is replaced by correctly received previous data. In this way it is attempted to maintain the characteristics of the audio signals at the decoder output, assuming that the audio sginal has not changed too much during that short time.

Furthermore, for example from "C. Perkins, O. Hodson, and V. Hardman, *A survey of packet-loss recovery techniques for streaming audio*", IEEE Network Magazine, September/October. 1998 and D. J. Goodman, G. B. Lockhart, O. J. Wasem, and W. Wong "*Waveform substitution techniques for recovering missing speech segments in packet voice communications*", IEEE Transactions on Acoustics, Speech and Signal Processing, ASSP-34:1449–1464, December 1986, it is known to replace lost or corrupted Pulse Code Modulation (PCM) data packets, i.e. not coded data, by repeating PCM samples from a previous pitch period as often as needed to fill in a lost frame.

However, the known methods are disadvantageous for several reasons.

Firstly, although replacement of the missing or corrupted voice data results in a higher sound quality than the usage of the corrupted data, which results in crackling noise, the resulting output voice signal sounds rough. In the case of muting, the annoying crackling noise is removed but the output audio signal still sounds rough because of the silent periods that are inserted. These silent periods are especially distinguishable in audio signals representing speech and more in particular voiced speech (i.e. sounds like 'a', 'e', 'i'). If replacement of lost or corrupted data by preceding code is used, phase errors may occur in the resulting output audio signal. The phase errors are caused by the length of the replaced data, because the length generally does not correspond to the pitch period of the audio signal represented by the data. The resulting output audio signal sounds may sound even rougher than a voice signal in which the muting mechanism is applied.

Furthermore, repeating output samples generally results in discontinuities at the borders of the repeated audio parts. Since these discontinuities are clearly audible, extra measures are needed to resolve the discontinuities. Moreover, if the audio signals are coded, at the end of an error burst the state of the decoder registers will generally be incorrect. Consequently, an output error will generally occur after repeating output samples, unless extra measures are taken to update the decoder registers after an error burst.

The invention seeks to provide a method with less of the above mentioned disadvantages. Therefore, in accordance with the invention a decoding method as indicated above further includes: storing said received coded data in a buffer as buffered data; determining an estimated periodicity of audio-signals represented by the corrupted data; and wherein replacing said corrupted data includes: replacing said corrupted data with buffered data stored in said buffer a time interval corresponding to substantially said estimated periodicity or substantially an integer multiple of said estimated periodicity before said corrupted data was received.

As the corrupted data is replaced with data from the buffer stored in the buffer during a time interval of the estimated periodicity or an integer multiple thereof, the audio signals represented by the buffered data are substantially of the same period and phase as the audio signals represented by the coded data that are replaced thereby reducing phase errors between the corrupted data and the replacement data. Furthermore, a more smooth transition is obtained between the coded data and replacement data and therefore less crackling. Also, the decoding acts as an leaky integration, i.e. a present decoding state is influenced by a previous decoding state. Thereby the obtianed audio data gradually decays from the buffered data insertion, so the transition from the replacement data to the original data is always continuous without additional measures being needed.

Also, according to the invention a data decoder system is provided, including: a system input for receiving coded data; a switch device having: a first switch input connected to the system input; a second switch input connected to a buffer device; and a switch output, said switch device having a first state wherein the first switch input is communicatively connected to the switch output and a second state in which the second switch input is communicatively connected to said switch output; a bit error detector device connected to the system input for detecting corrupted data in the coded data, said bit error detector device switching said switch device to said second state if corrupted data is detected and switching said switch device to said first state if no corrupted data is detected; a buffer device having a buffer input connected to said system input for storing coded data as buffered data and a buffer output for outputting buffered data having a time delay with respect to the moment of receiving the data; a decoder device connected to said switch output, for decoding at least said coded data whereby audio data representing audio signals are obtained, said decoder device having a decoder input and a decoder output; a pitch measure device connected to the decoder output for estimating an estimated periodicity of audio-signals represented by the corrupted data; said pitch estimator device setting said time delay to a substantially one or an integer multiple of the estimated period; a system output communicatively connected to the decoder output for transmitting said audio data further.

Such a decoder system is able to perform a method according to the invention. Furthermore, such a system may be implemented just at the receiver side of a data connection only, thereby avoiding adaptation of communication protocols or costly implementation at the transmission side of the data connection.

Furthermore, devices including such a decoding system and a computer program for performing steps of a method according to the invention are provided.

Further details, aspects and embodiments of the invention will be described with reference to the figures in the attached drawing.

In the following, the invention will be described by way of example in the application of coded audio data or signals. However, the invention may likewise be applied to other data and/or signals such as for example video data.

Figure 1:
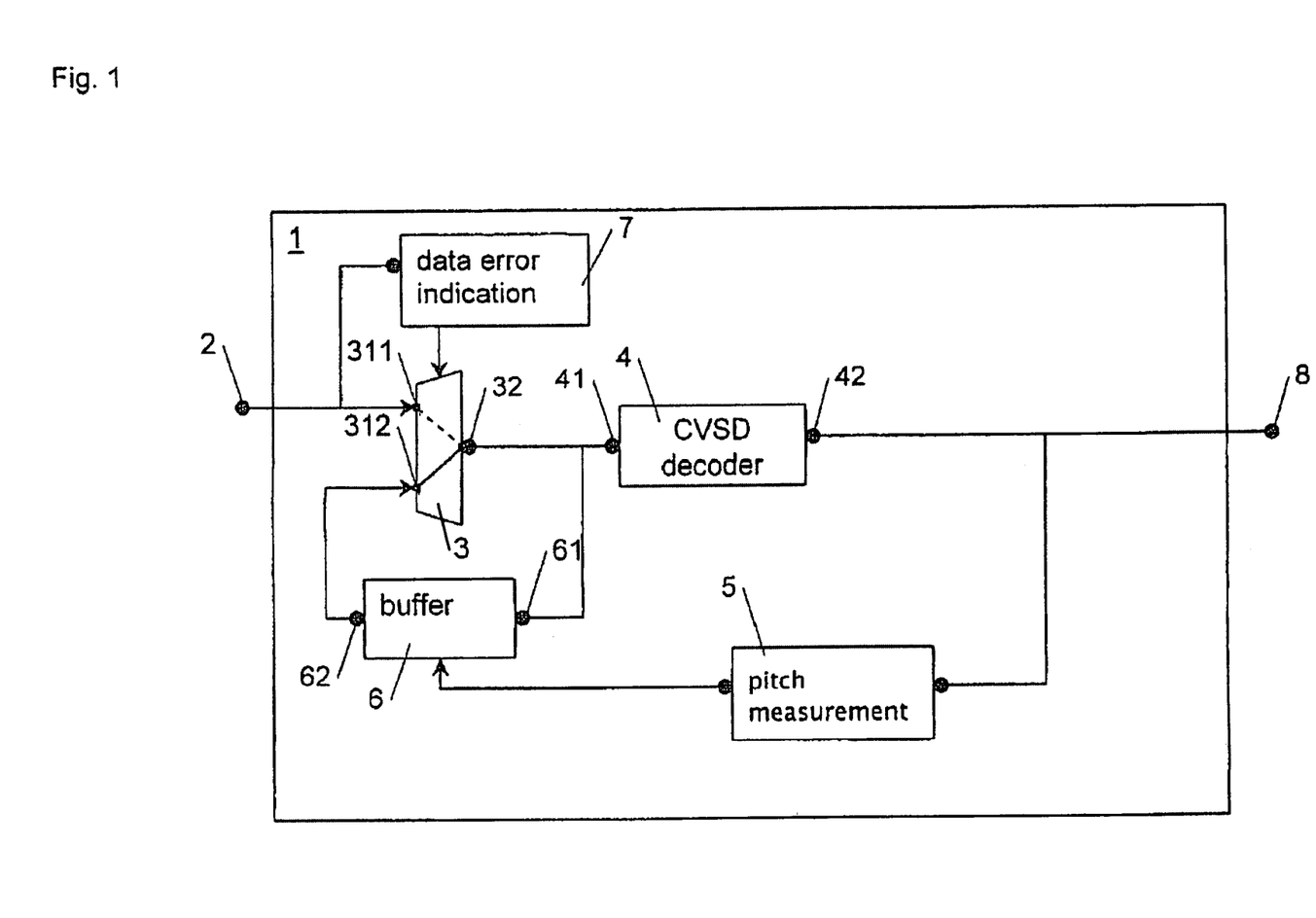
FIG. 1 shows a block diagram of an example of an embodiment of a decoder system according to the invention.

In FIG. 1 a decoder system 1 is shown. The decoder system 1 has a system input 2 at which coded data may be received. The system input 2 is connected to a first switch input 311 of a switch device 3. The switch 3 connects in a first state the first switch input 311 to the switch output 32 and in a second state of the switch a second switch input 312 is connected to the switch output 32. The switch device 3 thus selects one of the switch inputs as an input for devices connected to the switch output 32. Connected to the switch output 32 is a decoder device 4 with a decoder input 41 and a decoder output 42. The decoder device 4 decodes the data received at the decoder input 41. After decoding the coded data, the decoder device 4 transmits the resulting data to a system output 8 of the decoder device 1 which system output is connected to the decoder output 42.

In this example the decoder device 4 is a Continuous Variable Slope Delta Modulation (CVSD) decoder device which decodes CVSD coded Pulse Code Modulation (PCM) data according to a CVSD decoding algorithm as is generally known in the art, for example from K. Shayood, "*Introduction to data compression*", $2^{nd}$ edition, Morgan Kaufman San Francisco 2000. CVSD decoders are used in many types of data connections, like for example in Bluetooth data links. However, the decoder device may also be of a different type. The decoder may for example be a differential waveform decoder. Furthermore, the decoder may be of a type adapted to audio signals in general or speech signals in particular, as known from the mentioned Shayood publication p. 329–334, incorporated in this application by reference.

Connected to the switch output 32 is a buffer input 61 of a buffer device 6. A copy of the received coded data is stored in the buffer device 6 as buffered data. A buffer output 62 is connected to the second switch input 312. Thereby, if the switch 3 is in the second state, the buffered data is used as input data for devices connected to the switch output 32 and therefore as input data of the CVSD decoder 4. The state of the switch 3 is controlled by a data error detector 7. When no data errors are detected, the switch 3 is in the first state and hence the coded data received at the system input 2 is submitted to the decoder 4. If the error detector detects an error in the coded data that are received, the detector 7 switches the switch 3 to the second state and the buffered data is looped back to the second switch input 312 with a certain delay tau. Thereby the data stored in buffer 6 is used as input for the decoder 4.

The error detector may be any device able to perform an error detection. For example, a device able of performing a error detection as is known from L. Peterson, B. Davie, "*Computer networks, a systems approach*", Morgan Kaufman San Francisco 2000 p. 92 and further, which is here incorporated by reference, may be used. However, other methods for detecting data errors may be used and the invention is not limited to a particular error detection method or error detector device.

Figure 2:
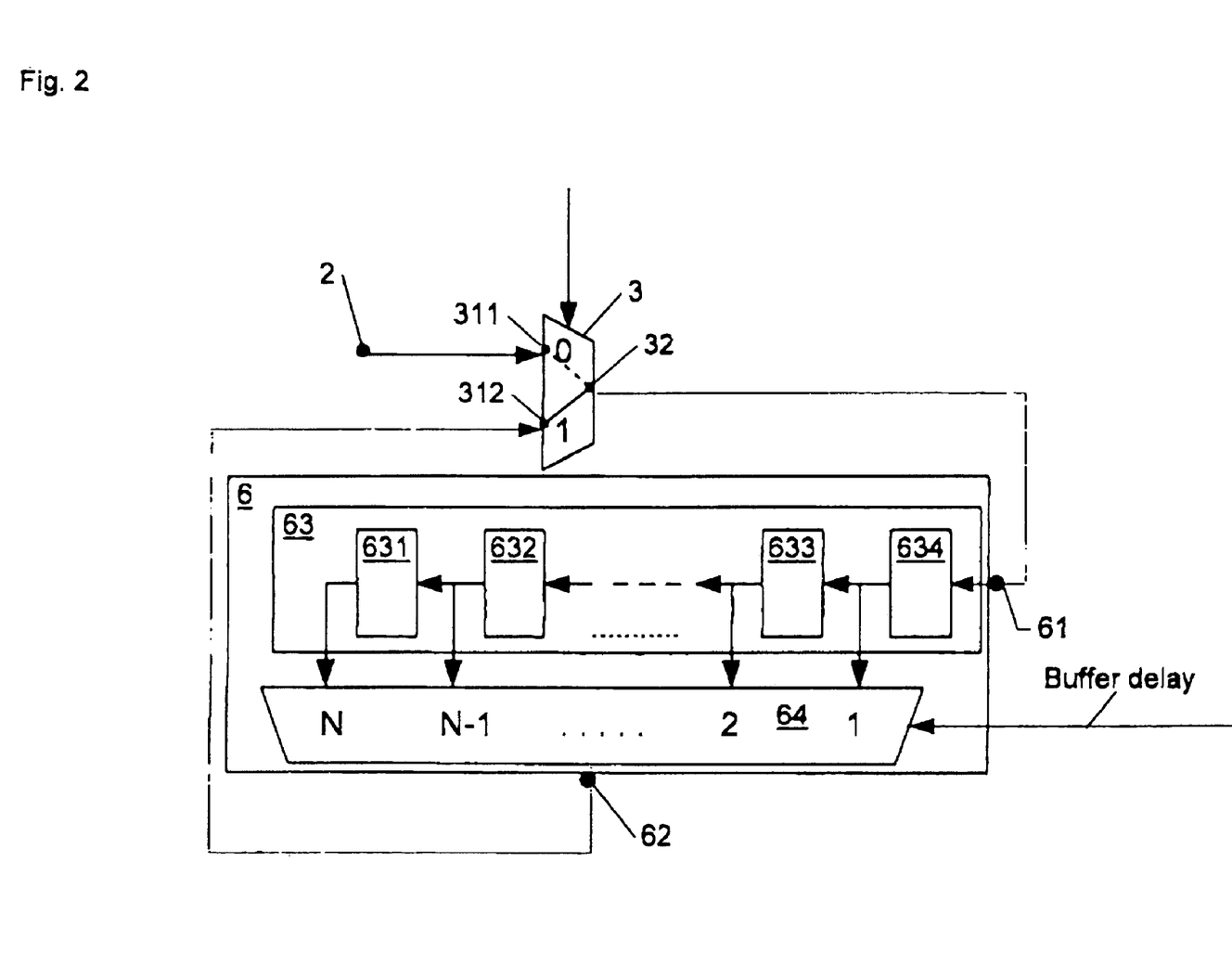
FIG. 2 shows a block diagram of an example of a buffer and a switch which may be used in the example of FIG. 1.

The buffer 6 in FIG. 1 may for example be implemented as shown in FIG. 2. The buffer 6 has a variable delay and includes an N-bit shift-register 63 and an N-channel selector 64, where N corresponds to the number of shift register sections and is equal to the maximum buffer delay. The shift-register 63 is connected to the buffer input 61 and has N memory positions of which four memory positions 631–634 are shown. By connecting one of the register positions via the channel selector 64 to the buffer output 62, the delay tau of the buffer 6 is set to $p*t_{sample}$, wherein $t_{sample}$ is the time interval between successive buffer input data samples and p is the position of the connected register.

The delay tau of the buffer 6 is set by a pitch measure device 5 connected to the decoder output 42. The pitch measure device 5 is connected to the buffer 6 and sets the delay of the buffer in correspondence with an estimated pitch period. The pitch period is measured by the pitch measure device 5 at the decoder output 42 for the decoded signals. The looped back buffered data is periodic in time because the delay is set in correspondence to the estimated pitch period of the decoded data.

Substitution of the corrupted coded data requires no extra measures in order to adapt the decoder state (accumulator and step size) and the registers of a decimation filter after an error burst. The decimation filter is used for the down conversion of the signal sampling rate. For example in the Bluetooth air interface, the decoder samples with 64000 samples per second, whereas the standard sample rate for speech signals is 8000 samples per second The down conversion is a two step operation. First the decimation filter filters all signal components above a certain frequency, which in the case of Bluetooth is 4 kHz and in the second step of each eight consecutive samples, seven samples are removed. Moreover, since the decoder device acts as a leaky integrator, continuity of its output speech signal is implicitly guaranteed. Consequently, no extra measures are needed to merge correct and substituted data signal parts.

Figure 3:
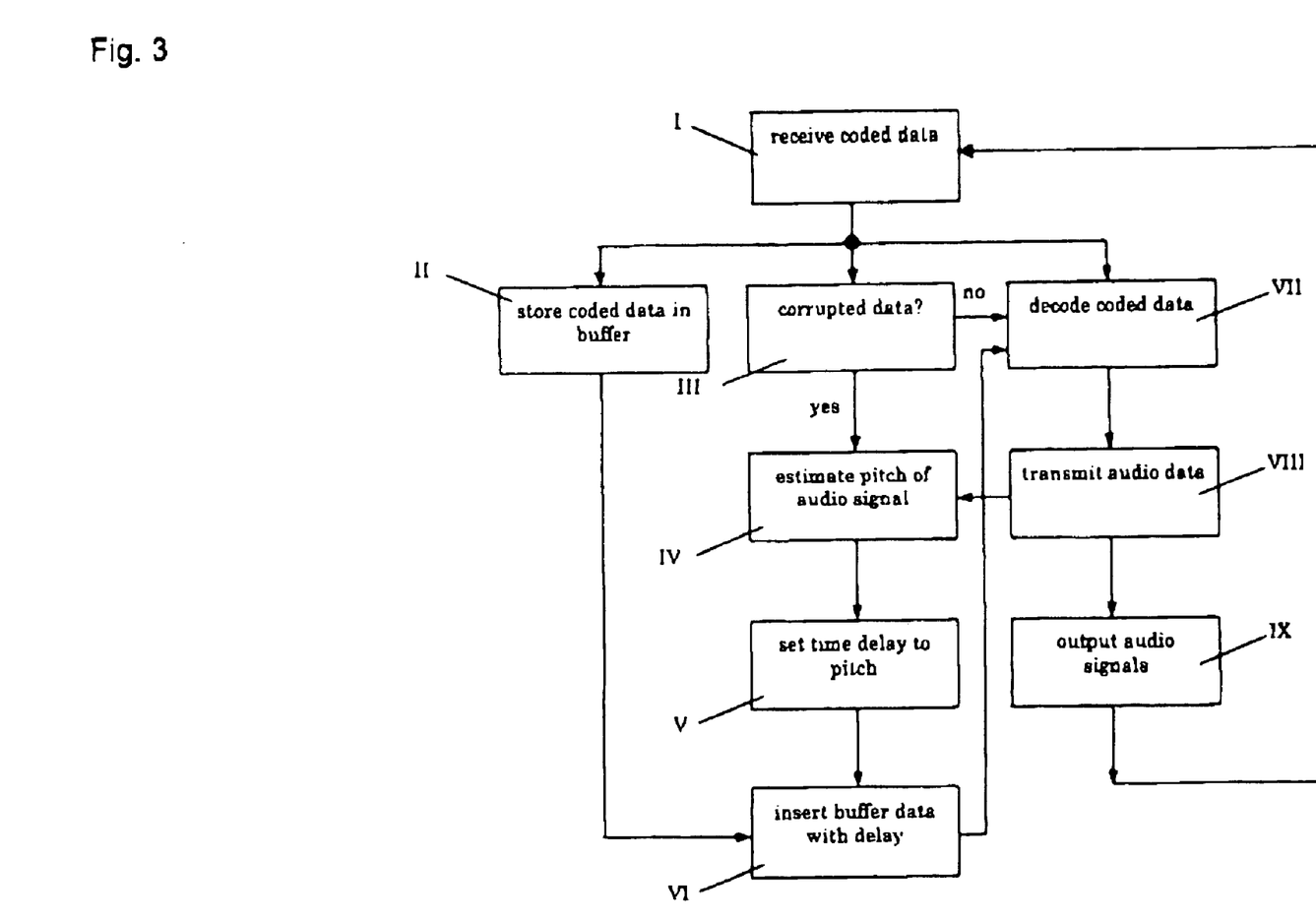
FIG. 3 shows a flow-chart of an example of a method according to the invention.

The decoder system 1 is able to perform a method as represented by the flow-chart shown in FIG. 3. In step I coded data is received. A copy of the coded data is stored in the buffer in step II. At the same time, in step III the coded data is checked on data errors. If no errors are detected, the data is decoded in step VII and the decoded data is transmitted further in step VIII. In the example, the decoded data is audio-data representing audio-signals and the audio-signals are outputted in step IX and then the execution is repeated from step I.

The audio-signals may for example be speech signals received by a headphone communicating via a Bluetooth protocol with a mobile phone. In that case, the step IX would then be the outputting of the speech signals by the headphones into the ears of a person. If the coded data is found to be corrupted in step III, the pitch of audio-signals represented by previously decoded data is estimated in step IV. Based on the estimated pitch a time delay of the buffer is set in step V. Thereafter, the data stored in the buffer is inserted with the set time delay in step VI and the step VII–IX are performed with the data from the buffer. The method is repeated or continued as long as desired.

Figure 6:
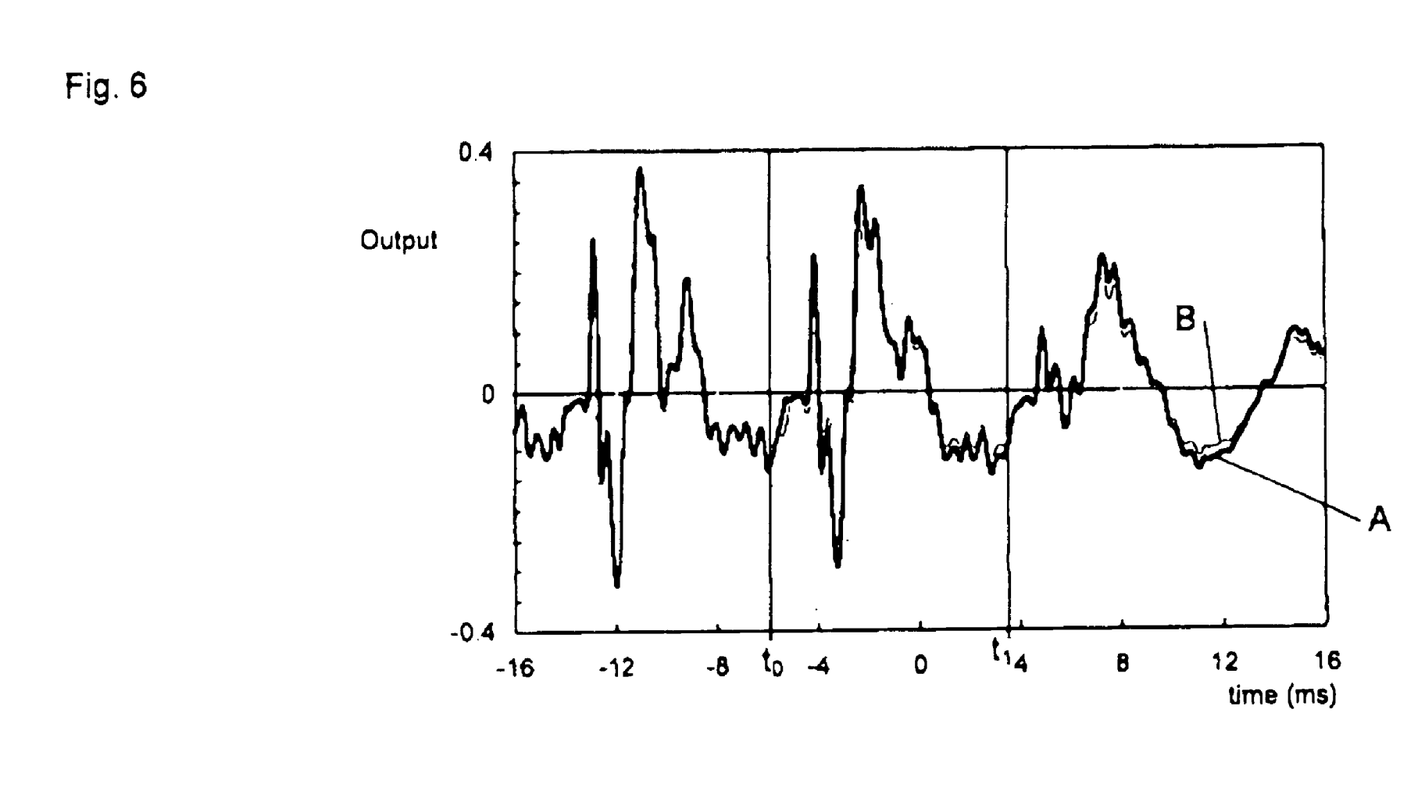
FIG. 6 shows a graph of a signal without data errors and a signal with data errors decoded with a method according to the invention.

In the graph shown in FIG. 6, the development in time of a not-corrupted signal, represented by thick solid line A, is shown. The same signal but corrupted, as represented by thin solid line B, is also shown. Between time to and time $t_1$ corrupted data of the corrupted signal has been replaced by a method according to the invention. As can be seen from FIG. 6, no discontinuities are shown in the resulting signal. The not-corrupted signal and the signal treated by the proposed method are almost the same. Therefore the treated signal has almost the same quality as the original signal and there are only minor differences between the corrupted signal and the original signal. The differences between the signal represented by solid line A and the signal represented by dotted line B after time $t_1$ is caused by the leaky integration of the decoding.

In order to estimate the pitch period of the speech signal at detection of a data error, a number W of speech samples transmitted directly before the data error is detected are taken and analysed by pitch estimation device 5. The analysing results in an optimal pitch period prediction kp_opt, which must be somewhere in a predefined period interval [kp_min , kp_max]. Typical values for the parameters W, kp_min and kp_max are listed in N. S. Jayant, Peter Noll, "*Digital Coding of Waveforms*, (*Principles and Applications to Speech and Video*)", Prentice-Hall, Englewood Cliffs, N.J., 1984, and are summarised in Table 1.

TABLE 1

| Parameter | Typical time value | Description |
|---|---|---|
| $k_p\_min$ | 2 msec | Minimum pitch period |
| $k_p\_max$ | 20 msec | Maximum pitch period |
| W | 32 msec | Size of analysis window |

From the "Jayant" publication a method for measuring the pitch period of a discrete-time signal x[n] at time instant m is known wherein the short-time autocorrelation function (autocorrelation function) of the signal x[n] is determined. The method may mathematically be described by:

$$R_{xx}(k, m) = \sum_{n=0}^{n=W-k-1} x[m-n] \cdot x[m-n-k] \quad (1)$$

In this equation $R_{xx}$ represents the value of the autocorrelation, n is a summation index which ranges from 0 to W-k-1 and k is a variable which is used to optimise the autocorrelation function. The pitch period can be found by maximizing the autocorrelation function with respect to k, where k is taken in the range [kp_min, kp_max].

Figure 4:
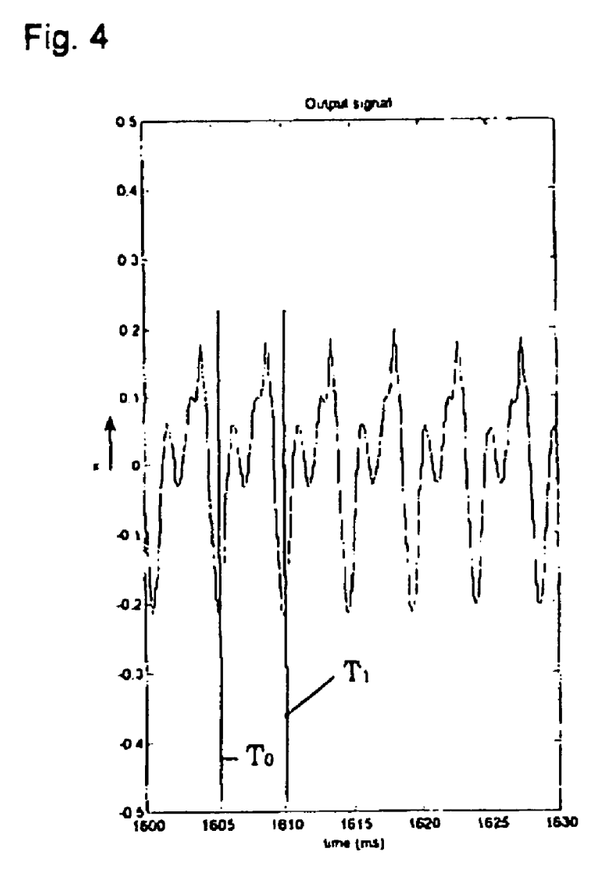
FIG. 4 shows a graph of a quasi-periodic speech signal.
Figure 5:
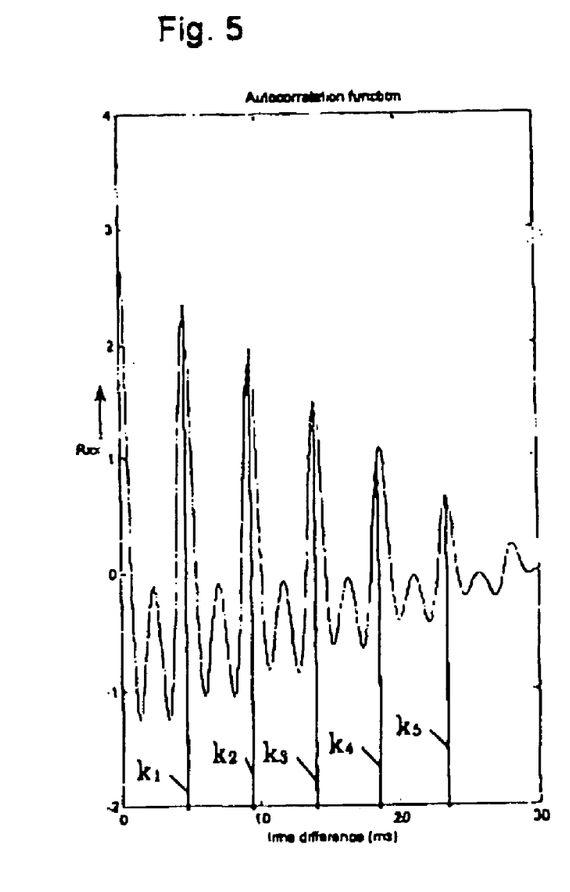
FIG. 5 shows a graph of the autocorrelation function of the speech signal in FIG. 4.

This mechanism is illustrated in FIGS. 4–5. In FIG. 4 the development during 30 ms of a speech signal is shown in an interval of time from 1600 ms to 1630 ms. In FIG. 5, the corresponding short-time autocorrelation function is shown, for an interval of values of parameter k from 0 to 30 ms. As can be seen in FIG. 5 the autocorrelation function has local maxima at time differences $k_1$, $k_2$, $k_3$, $k_4$ and $k_5$. $k_2$-$k_5$ are an integer multiple of $k_1$. Therefore, the period of the signal is estimated to be equal to $k_1$. The value of $k_1$ is approximately 5 ms. As can be seen in FIG. 4 a single period of the signal is equal to the interval from $T_0$ to $T_1$ and is approximately 5 ms. Estimation of the pitch by calculating the maximum of the autocorrelation function thus results in a correct estimated pitch.

The short-time autocorrelation function may also be calculated according to a method described by the following equation:

$$R_{xx}(k,m)=\alpha \cdot R_{xx}(k,m-1)+x[m] \cdot x[m-k] \quad (2)$$

Calculation of the autocorrelation function according to equation 2 involves less processing than eq. 1, particularly when α is set to $1-2^{-b}$ where b is an integer number. Equation 2 may be used if a fast estimation of the pitch is required. Although equation 2 does not exactly give the same results as equation 1, it has shown to give results with a comparable reliability.

If the pitch estimation range is chosen according to table 1, annoying beeps may appear in unvoiced speech parts. Unvoiced speech parts are non-periodic and generally have a decreasing short-time autocorrelation function. Maximising the autocorrelation function thus results in a low pitch period estimation, close to the lower bound of the pitch estimation range. When this lower bound is chosen close to 2 msec, a code segment corresponding to an unvoiced speech part of approximately 2 msec is repeated as often as needed to substitute the lost packets. Since the resulting output speech signal part is approximately periodic in time with a very short period, this may cause an annoying tone in the output speech signal. In order to prevent the beeps in the output unvoiced speech signal parts may be muted or the lower bound of the pitch estimation range, may be increased to for example to 4 msec.

When muting is used, a mechanism is needed to distinguish between voiced and unvoiced (speech) signals. This may be implemented by marking signals as 'unvoiced' if the pitch period estimation is below a certain threshold (for example 4 msec). Other methods may be used too, for example using characteristic differences between voiced and unvoiced (speech) signals such as the lack of periodicity or signal to noise ratio.

When the lower bound of the pitch estimation is increased, voiced speech signal parts with a pitch period below the lower bound of the pitch period estimation range result in a pitch period estimation that is approximately a multiple of the real pitch period. Since voiced speech signal parts are approximately periodic in time, this does not result in a severe degradation of the output voice signal.

It should be apparent to the worker in this field of art that the invention is not limited to implementation in the disclosed example of a physical device, but can likewise be applied in another device. In particular, the invention is not limited to physical devices but can also be applied in logical devices of a more abstract kind or in software arranged for performing the device functions when running on a general purpose computer system Furthermore, it should be apparent that any sufficiently accurate pitch estimation method may be used and the invention is not limited to the described examples of pitch measurements. Various other pitch measurement methods are known in the art and the invention is not limited to a specific one of them.

Figure 7:
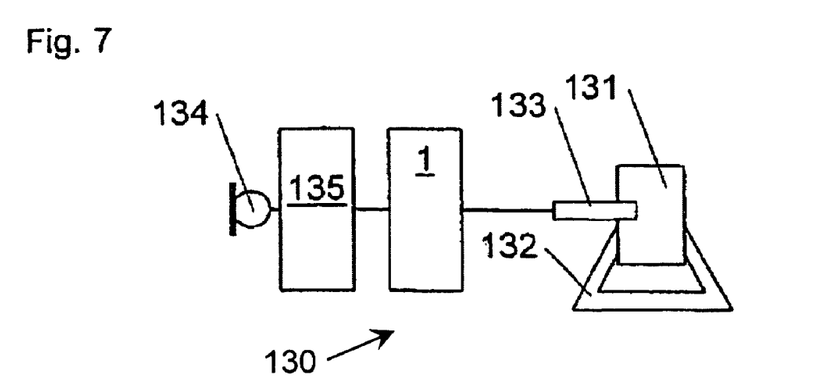
FIG. 7 diagrammatically shows an embodiment of a data storage device in which a decoder system according to the invention is implemented.

A decoder system according to the invention may be used in any signal processing device including a signal receiver connected to a decoder system according to the invention. The decoder system may be connected to a signal processing section which processes the decoded signals further. FIGS. 7–10 show example of signal processing devices in which a decoder system as proposed is used. For example, as is shown in FIG. 7 a decoder system 1 may be used in a data storage device 130, for example an MPEG 3 recorder connected to the internet via a Bluetooth link, for storing data on a data container device 131, for example a flash memory card. The data storage device 130 in FIG. 7 includes holder means 132 for a data container device 131, writer means 133 for writing data to the data container device 132, input signal receiver means 134, for example a wireless receiver, and a decoder device 1 connected between the input signal receiver means 134 and the writer means 133. Between the decoder and the receiver means 134, a device 135 is placed for processing the received signals. Of course, after decoding the signals, other processing may be performed before storing the data on the data container 132.

Figure 8:
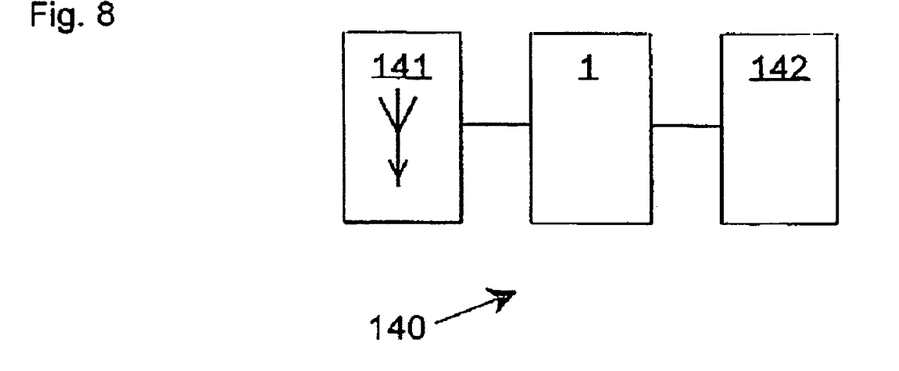
FIG. 8 diagrammatically shows an embodiment of a data processing device in which a decoder system according to the invention is implemented.

It is equally further possible to provide a data processing device 140 including input signal receiver means 141, like a wireless connection to a computer network and data process means 142 with a decoder device 1 according to the invention, as is shown in FIG. 8. Such a data processing device 140 might be a laptop computer connected to a LAN or the internet via a wireless connection, like a Bluetooth datalink.

Figure 9:
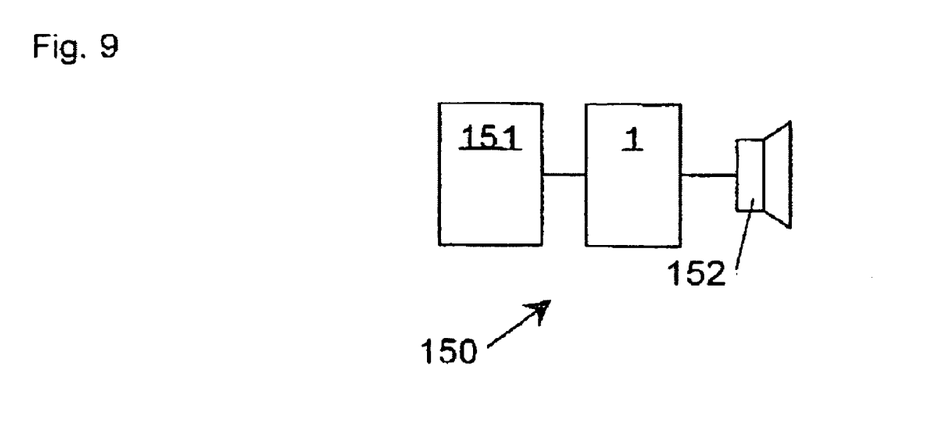
FIG. 9 diagrammatically shows an embodiment of an audio device in which a decoder system according to the invention is implemented.
Figure 10:
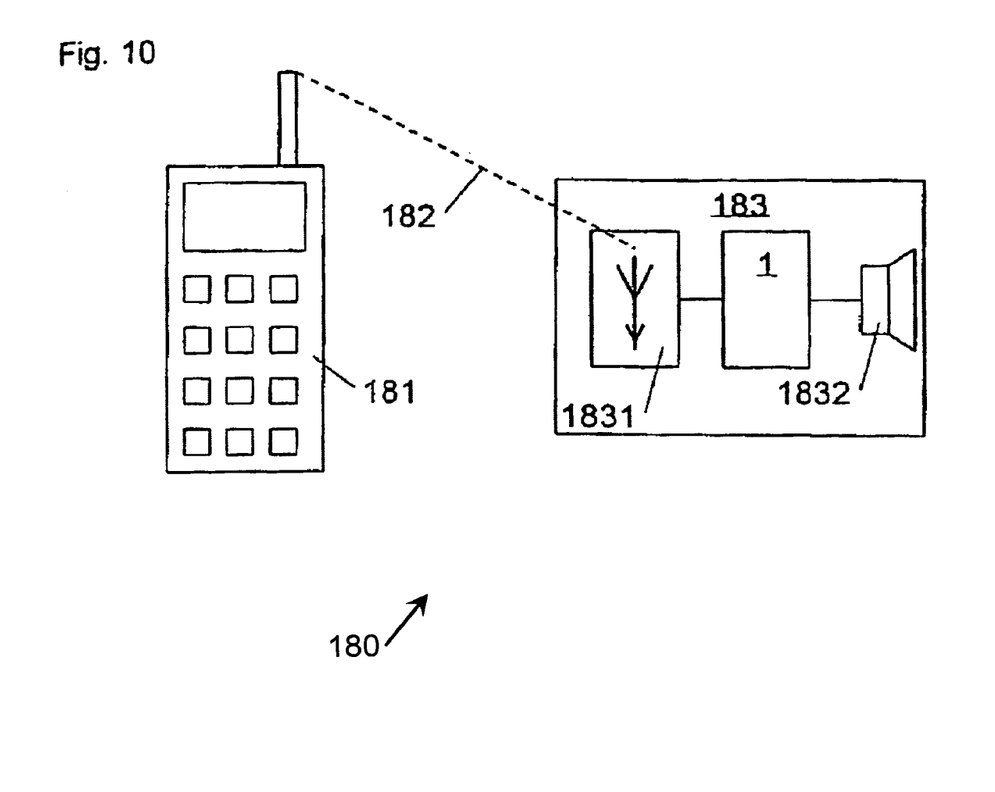
FIG. 10 diagrammatically shows an embodiment of a data network which a decoder system according to the invention is implemented.

It is also possible to provide an audio device 150 like a home stereo set or multi-channel player, including data input means 151, like a radio or Bluetooth receiver, and audio output means 152 like a loudspeaker, with a decoder device 1 to the invention, as is shown in FIG. 9. This is especially advantageous if the audio device receives data via a Bluetooth protocol and the decoder device 1 is a CVSD decoder, since CVSD decoding does comply with the Bluetooth standard, thereby enhancing the quality of the output.

A decoder system according to the invention may also be applied in a data network including a transmitter node and a connection between the transmitter node and a receiver node. The receiver node in the network may then include a decoder system according to the invention. An example of such a network is shown at 180 in FIG. 10. The network 180 includes a headphone 183 as receiver node receiving voice data via a wireless Bluetooth connection 182 from a mobile phone 181 acting as a transmitter node. The headphone 183 includes an receiver device 1831 connected to a decoder system 1 according to the invention. At the output of the decode system 1 a speaker 1832 is provided which outputs audio signals represented by the coded data.

After the above explanation, many other applications of the invention will be apparent to a skilled person.

The invention claimed is:

1. A decoding method for decoding coded data including:
receiving coded data representing original data coded with a coding method, detecting corrupted data of said coded data;
replacing at least a part of said corrupted data with replacement data;
decoding said coded data with a decoding method substantially reverse to said coding method, whereby said original data is obtained; and
transmitting said obtained original data further;
wherein
said method further includes:
storing said received coded data in a buffer as buffered data;
determining an estimated periodicity of the original data represented by the corrupted data; and
replacing said corrupted data includes:
replacing said corrupted data with buffered data stored in said buffer having a time interval corresponding to substantially said estimated periodicity or substantially an integer multiple of said estimated periodicity before said corrupted data was received.

2. A method as claimed in claim 1, wherein said determining an estimated periodicity is based on original data obtained or received before said corrupted data is detected.

3. A method as claimed in claim 2, wherein said determining an estimated periodicity is based on a periodicity of original data obtained from coded data received directly before said corrupted data is detected.

4. A method as claimed in claim 2, wherein said determining an estimated periodicity includes determining an autocorrelation function of said original data.

5. A method as claimed in claim 4, wherein said determining of said auto-correlation function is an operation represented by the mathematical algorithm:

$$R_{xx}(k, m) = \sum_{n=0}^{n=W-k-1} x[m-n] \cdot x[m-n-k]$$

in which algorithm $R_{xx}$ represents the autocorrelation value; x [m−n] represents a value of the signal at moment m−n; k represents a time shift; W represents the number of values of the signal taken to compute the autocorrelation function for; m represents a certain time moment.

6. A method as claimed in claim 4, wherein said determining of said autocorrelation function is an operation represented by the mathematical algorithm:

$$R_{xx}(k,m) = \alpha R_{xx}(k,m-1) + x[m]X[m-k]$$

in which algorithm $R_{xx}$ represents the autocorrelation value; x[m−n] represents a value of the signal at moment m−n; k represents a time shift; W represents the number of values of the signal taken to compute the autocorrelation function for; m represents a certain time moment and $\alpha$ represents a constant number.

7. A method as claimed in claim 1, wherein said original data is audio data representing audio signals.

8. A method for decoding coded data including:
receiving coded data representing audio data representing audio signals coded with a coding method, detecting corrupted data of said coded data; replacing at least a part of said corrupted data with replacement data; decoding said coded data with a decoding method substantially reverse to said coding method, whereby said original data is obtained; and
transmitting said obtained original data further;
wherein said method further includes: determining whether the audio data represent voiced signals or unvoiced signals and
if said audio data represent unvoiced signals:
   replacing at least a part of said corrupted data with replacement data representing silence code and
if said audio data represent voice signals:
   storing said received coded data in a buffer as buffer data;
   determining an estimated periodicity of the original data represented by the corrupted data; and
   replacing at least a part of said corrupted data with buffered data stored in said buffer having a time interval corresponding to substantially said estimated periodicity or substantially an integer multiple of said estimated periodicity before said corrupted data was received.

9. A method as claimed in claim 8, wherein the coded data is coded with a coding method adapted for speech signals.

10. A method as claimed in claim 9, wherein the coded data is coded with a differential waveform coding method.

11. A method as claimed in claim 10, wherein the coded data is coded with a continuous variable slope delta coding method.

12. A method as claimed in claim 8, further including after transmitting said audio data further a step of outputting said audio-signals in a for humans perceptible form.

13. A data decoder system, including:
a system input for receiving coded data;
a switch device having:
   a first switch input connected to the system input;
   a second switch input connected to a buffer device; and
   a switch output, said switch device having a first state wherein the first switch input is communicatively connected to said switch output and a second state in which the second switch input is communicatively connected to said switch output;
a bit error detector device connected to the system input for detecting corrupted data in the coded data, switching said switch device to said second state if corrupted data is detected, and switching said switch device to said first state if no corrupted data is detected;
a buffer device having a buffer input connected to said system input for storing coded data as buffered data and a buffer output for outputting buffered data having a time delay with respect to a moment of receiving of the data;
a decoder device connected to said switch output, for decoding at least said coded data whereby original data is obtained, said decoder device having a decoder input and a decoder output;
a periodicity estimator device connected to the decoder output for determining an estimated periodicity of the original data represented by the corrupted data and setting said time delay to substantially the estimated period or an integer multiple thereof a system output communicatively connected to the decoder output for transmitting said original data further.

14. A system as claimed in claim 13, wherein said periodicity estimator device is arranged for determining a period of original data obtained or received before said corrupted data is detected.

15. A system as claimed in claim 14, wherein said periodicity estimator device is arranged for estimating the period of original data obtained from coded data received directly before said corrupted data is detected.

16. A system as claimed in claim 13, wherein said periodicity estimator device is an autocorrelator device for computing an autocorrelation function of original data.

17. A system as claimed in claim 16, wherein said autocorrelator device is arranged for performing an operation represented by the mathematical algorithm:

$$R_{xx}(k, m) = \sum_{n=0}^{n=W-k-1} x[m-n] \cdot x[m-n-k]$$

in which algorithm $R_{xx}$ represents the autocorrelation value; $x[m-n]$ represents a value of the signal at moment m−n; k represents a time shift; W represents the number of values of the signal taken to compute the autocorrelator function for; m represents a certain time moment.

18. A system as claimed in claim 16, wherein said autocorrelator device is arranged for performing an operation represented by the mathematical algorithm:

$$R_{xx}(k,m)=\alpha R_{xx}(k,m-1)+x[m]X[m-k]$$

in which algorithm $R_{xx}$ represents the autocorrelation value; $x[m-n]$ represents a value of the signal at moment m−n; k represents a time shift; W represents the number of values of the signal taken to compute the autocorrelation function for; m represents a certain time moment and $\alpha$ represents a constant number.

19. A system as claimed in claim 13, wherein said original data is audio data representing audio signals.

20. A system as claimed in claim 19 further including:
an unvoiced signal detector connected to said decoder output for determining whether the audio data represent voiced signals or unvoiced signals;
a bit generator device connected to the decoder input for generating data representing a preset signal, the bit generator device being activated if the unvoiced signal detector detects an unvoiced signal and being communicatively connected thereto.

21. A system as claimed in claim 19, wherein the decoding device is adapted for coding speech signals.

22. A system as claimed in claim 21, wherein the decoding device is a differential waveform coding device.

23. A system as claimed in claim 22, wherein the decoding device is a continuous variable slope delta coding device.

24. A system as claimed in claim 19, wherein the decoder output is communicatively connected to an audio output device for outputting the audio-signals represented by the audio data in a for humans perceptible form.

25. A signal processing device at least including:
a receiver device for receiving signals,
a decoder system including:
a system input for receiving coded data;
a switch device having:
   a first switch input connected to the system input;
   a second switch input connected to a buffer device; and a switch output, said switch device having a first state wherein the first switch input is communicatively connected to said switch output and a second state in which the second switch input is communicatively connected to said switch output;

a bit error detector device connected to the system input for detecting corrupted data in the coded data, switching said switch device to said second state if corrupted data is detected, and switching said switch device to said first state if no corrupted data is detected;

a buffer device having a buffer input connected to said system input for storing coded data as buffered data and a buffer output for outputting buffered data having a time delay with respect to a moment of receiving of the data;

a decoder device connected to said switch output, for decoding at least said coded data whereby original data is obtained, said decoder device having a de-coder input and a decoder output;

a periodicity estimator device connected to the decoder output for determining an estimated periodicity of the original data represented by the corrupted data and setting said time delay to substantially the estimated period or an integer multiple thereof;

a system output communicatively connected to the decoder output for transmitting said original data further, wherein the system input is connected to said receiver device; and a signal processing section for processing the decoded signals further, said signal processing section being connected to the system output of said decoder.

26. A data container device containing data representing signals decoded with a decoding method for receiving coded data representing original data coded with a coding method, the decoding method comprising:

detecting corrupted data of said coded data;

replacing at least a part of said corrupted data with replacement data; decoding said coded data with a decoding method substantially reverse to said coding method, whereby said original data is obtained; and transmitting said obtained original data further;

wherein said method further includes:

storing said received coded data in a buffer as buffered data;

determining an estimated periodicity of the original data represented by the corrupted data; and replacing said corrupted data includes:

replacing said corrupted data with buffered data stored in said buffer having a time interval corresponding to substantially said estimated periodicity or substantially an integer multiple of said estimated periodicity before said corrupted data was received.

* * * * *

UNITED STATES PATENT AND TRADEMARK OFFICE
CERTIFICATE OF CORRECTION

PATENT NO. : 7,206,986 B2
APPLICATION NO. : 10/497187
DATED : April 17, 2007
INVENTOR(S) : Stemerdink et al.

It is certified that error appears in the above-identified patent and that said Letters Patent is hereby corrected as shown below:

On the Title Page, in Field (57), under "ABSTRACT", in Column 2, Line 3, after "buffer" insert -- having --.

In Column 1, Line 5, delete "PCT/NLO01/00873" and insert -- PCT/NL01/00873 --, therefor.

In Column 5, Line 37, delete "to" and insert -- $t_0$ --, therefor.

In Column 5, in "TABLE 1", under "Parameter", Line 1, delete "$k_p$_min" and insert -- kp_min --, therefor.

In Column 5, in "TABLE 1", under "Parameter", Line 2, delete "$k_p$_max" and insert -- kp_max --, therefor.

In Column 8, Line 58, in Claim 6, delete "$R_{xx}(k,m)=\alpha R_{xx}(k,m-1)+x[m]X[m-k]$" and insert -- $R_{xx}(k,m)=\alpha \cdot R_{xx}(k,m-1)+x[m]\cdot x[m-k]$ --, therefor.

In Column 10, Line 32, in Claim 18, delete "$R_{xx}(k,m)=\alpha R_{xx}(k,m-1)+x[m]X[m-k]$" and insert -- $R_{xx}(k,m)=\alpha \cdot R_{xx}(k,m-1)+x[m]\cdot x[m-k]$ --, therefor.

Signed and Sealed this

Fifteenth Day of December, 2009

David J. Kappos
*Director of the United States Patent and Trademark Office*